(12) United States Patent
Ragan (10) Patent No.: US 10,994,953 B2
(45) Date of Patent: May 4, 2021

(54) TRAY CONVEYOR DRIVEN BY BRUSHLESS DC MOTOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/609,694

(22) PCT Filed: Apr. 3, 2018

(86) PCT No.: PCT/US2018/025779
§ 371 (c)(1),
(2) Date: Oct. 30, 2019

(87) PCT Pub. No.: WO2018/204006
PCT Pub. Date: Nov. 8, 2018

(65) Prior Publication Data
US 2020/0198905 A1    Jun. 25, 2020

Related U.S. Application Data

(60) Provisional application No. 62/500,267, filed on May 2, 2017.

(51) Int. Cl.
*B65G 54/02* (2006.01)
*H02K 41/035* (2006.01)
(Continued)

(52) U.S. Cl.
CPC ......... *B65G 54/02* (2013.01); *H02K 41/0356* (2013.01); *B60L 13/03* (2013.01);
(Continued)

(58) Field of Classification Search
CPC ...... B65G 54/02; B65G 23/23; H02K 41/035; H02K 41/031; H02K 41/0356
(Continued)

(56) References Cited

U.S. PATENT DOCUMENTS 3,625,181 A    12/1971   Weaver
3,786,779 A    1/1974    Brunel et al.
(Continued)

FOREIGN PATENT DOCUMENTS

EP    0241875 A2    10/1987
EP    425021    *  5/1991    ............. B65G 23/23
(Continued)

OTHER PUBLICATIONS

Extended European Search Report of European Patent Application No. 18794640.5, dated Dec. 10, 2020, European Patent Office, Munich, Germany.
(Continued)

*Primary Examiner* — James R Bidwell
(74) *Attorney, Agent, or Firm* — James T. Cronvich (57) ABSTRACT

A conveyor for conveying articles supported on independently powered and controllable trays. Each tray comprises a blade suspended from an article-supporting platform. A series of drive coils is embedded in the blade. A battery and a controller embedded in the tray drive the drive coils. The blade rides in a slot between two conveyor rails that support the tray platform. The slot is bounded by an array of permanent magnets along each rail. The drive coils produce an electromagnetic field that interacts with the permanent-magnet field in the slot to form a brushless dc motor that propels the tray along the rails.

33 Claims, 8 Drawing Sheets

(51) Int. Cl.
*B60L 13/03* (2006.01)
*H02K 41/03* (2006.01)
*H04N 5/232* (2006.01)

(52) U.S. Cl.
CPC ........ *B60L 2200/26* (2013.01); *H02K 41/031* (2013.01); *H04N 5/23287* (2013.01)

(58) Field of Classification Search
USPC .................................................. 198/805, 619
See application file for complete search history.

(56) References Cited

U.S. PATENT DOCUMENTS

| | | | |
|---|---|---|---|
| 3,788,447 A * | 1/1974 | Stephanoff | B65G 23/00 |
| | | | 198/619 |
| 4,092,554 A * | 5/1978 | Quinn | B60L 7/10 |
| | | | 104/292 |
| 4,613,805 A | 9/1986 | Matsuo et al. | |
| 4,767,954 A | 8/1988 | Phillips | |
| 6,279,728 B1 | 8/2001 | Jung et al. | |
| 6,531,793 B1 | 3/2003 | Frissen et al. | |
| 6,684,794 B2 | 2/2004 | Fiske et al. | |
| 6,879,063 B2 | 4/2005 | Frissen et al. | |
| 7,096,794 B2 * | 8/2006 | Post | F16C 32/0406 |
| | | | 104/281 |
| 7,948,122 B2 | 5/2011 | Compter et al. | |
| 9,611,107 B2 | 4/2017 | Wernersbach et al. | |
| 9,729,039 B2 * | 8/2017 | Hon | H02K 41/031 |
| 2010/0031856 A1 | 2/2010 | Shoda et al. | |
| 2011/0100252 A1 | 5/2011 | Fukukawa | |
| 2013/0187573 A1 | 7/2013 | Inoue | |
| 2015/0274433 A1 * | 10/2015 | Hanisch | B65G 43/02 |
| | | | 198/805 |
| 2015/0303841 A1 * | 10/2015 | Suzuki | H02P 25/06 |
| | | | 318/38 |
| 2017/0331359 A1 | 11/2017 | Paweletz et al. | |

FOREIGN PATENT DOCUMENTS

| | | |
|---|---|---|
| EP | 1956705 A1 | 8/2008 |
| JP | 2001204108 A | 7/2001 |
| JP | 2004015894 A | 1/2004 |
| WO | 2009083889 A1 | 7/2009 |
| WO | 2014059134 A1 | 4/2014 |

OTHER PUBLICATIONS

Office Action, Chinese Patent Application No. 201880028303.0, dated Feb. 28, 2021, China National Intellectual Property Administration.

* cited by examiner

TRAY CONVEYOR DRIVEN BY BRUSHLESS DC MOTOR

BACKGROUND

The invention relates generally to power-driven conveyors and more particularly to conveyors in which trays are driven independently by brushless dc motors.

Conventional conveying systems, such as those conveying articles on flat belts, modular belts or chains, and powered or gravity rollers, provide many harbors for pathogens and other contaminants. Motors, gearboxes, roller bearings, shafts, pulleys, and sprockets can all collect food particles and grease and require regular cleaning. In food applications all the conveyor parts have to comply with demanding food-use standards. Furthermore, conventional conveyors require significant electrical infrastructure for power and control. Cable routing and connections add additional harbors for contaminants.

SUMMARY

One version of a conveyor embodying features of the invention comprises a rail having an array of permanent magnets extending along the length of the rail to form a permanent-magnet stator and a tray supported on the rail. The rail has a top article-supporting surface and a series of commutated drive coils as a forcer that coacts with the permanent-magnet stator to form a brushless linear dc motor to propel the tray along the rail.

Another version of a conveyor embodying features of the invention comprises a tray supported on a rail. The tray has a top article-supporting surface, a series of drive coils, a tray controller, and a power supply supplying power to the tray controller to commutate the currents in the series of drive coils. The rail has an array of permanent magnets extending along its length. The array of permanent magnets and the drive coils in the tray form a brushless linear dc motor to propel the tray along the rail.

In another aspect a conveyor tray embodying features of the invention comprises a platform having a first end and a second end defining the length of the tray and a top article-supporting surface and a bottom surface extending from the first end to the second end. A blade extends downward from the bottom surface from the first end to the second end and houses a series of drive coils. A tray controller drives the drive coils, and a power supply supplies power to the tray controller and the drive coils.

DETAILED DESCRIPTION

Figure 1:
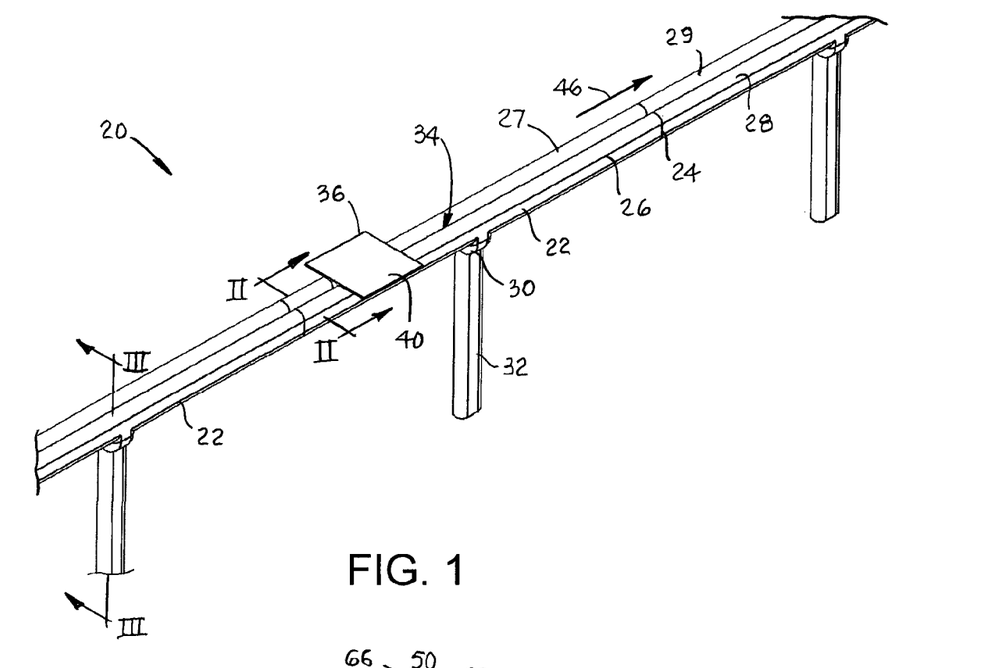
FIG. 1 is an isometric view of a portion of a tray conveyor embodying features of the invention.
Figure 2:
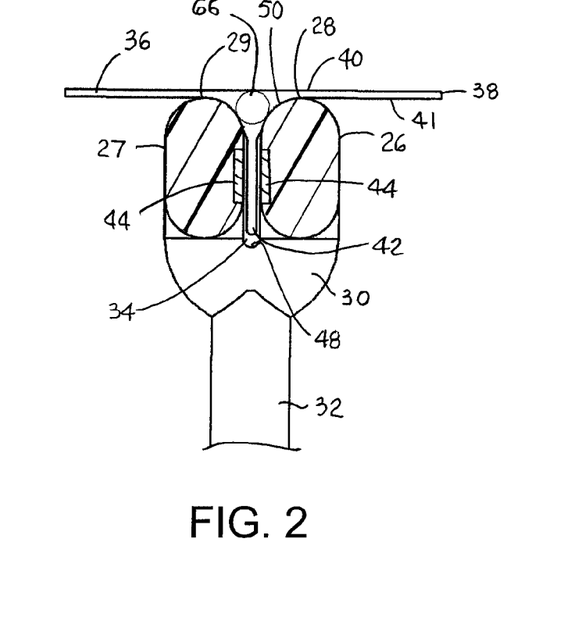
FIG. 2 is an enlarged cross section of the tray conveyor viewed along lines II-II of FIG. 1.

A portion of one version of a conveyor embodying features of the invention is shown in FIG. 1. The conveyor section 20 is constructed of a series of tray conveyor segments 22 connected end to end at bonded joints 24 for smooth transitions. As also shown in FIG. 2, the tray conveyor segments 22 each comprise a pair of closely spaced rails 26, 27 having convexly rounded tops 28, 29 and bottoms joined by a rail base 30 from which a single leg 32 extends downward to mount to a floor. The two rails 26, 27 are separated by a narrow slot 34. A tray 36 has a platform 38 with a top article-supporting surface 40 and an opposite bottom surface 41 supported on the tops 28, 29 of the rails 26, 27. A blade 42 extends downward from the bottom surface 41 of the tray 36 into the slot 34. The tray 36 shown in this example with a centrally located blade 42 forms a T in a vertical cross section. A linear array of permanent magnets 44 in each rail 26, 27 produces a magnetic field through the slot 34 and the tray blade 42. The magnitude and direction of the static magnetic field vary periodically along the length of the slot 34. Forcer coils (not shown in FIG. 1) in the tray blade 42 produce a varying electromagnetic field that interacts with the magnetic field produced by the linear permanent-magnet arrays in the rail to create a force propelling the tray 36 along the conveyor in a conveying direction 46.

Figure 3:
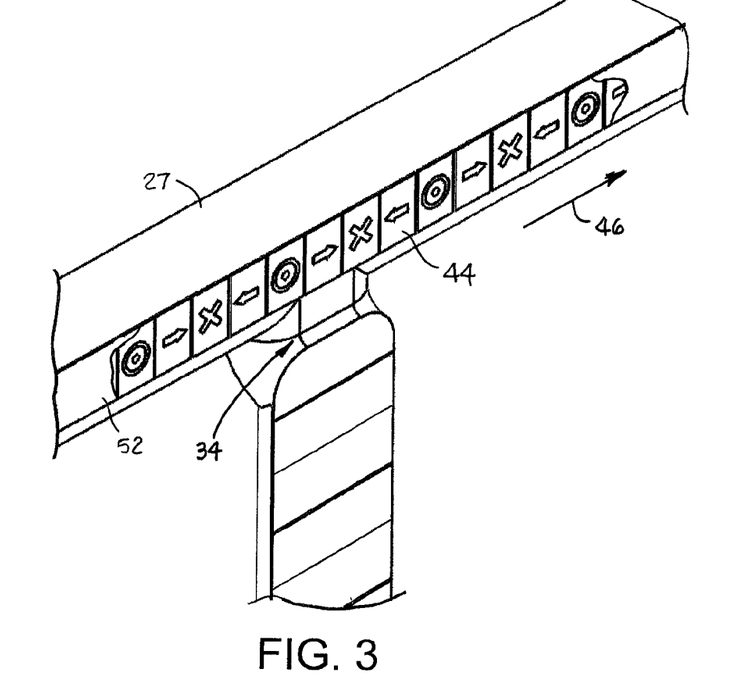
FIG. 3 is an enlarged cross section of the tray conveyor viewed along lines of FIG. 1 with the inside wall of a support rail cut away to reveal a permanent-magnet array.

As shown in FIG. 2, the slot 34 above the leg 32 extends upward from a lower blind end 48 formed by the rail base 30 to a top opening 50 that widens at the tops 28, 29 of the rails 26, 27. Elsewhere, the slot 34 is open at both top and bottom. As shown in FIG. 3, the linear array of permanent magnets 44 is embedded in the rail 27 close to an inside wall 52 of the rail bounding the slot 34. To increase the intensity of the magnetic field in the slot 34, the permanent magnets 44 are shown arranged to form a Halbach array. The static magnetic field traversing the slot 34 varies spatially in amplitude and direction in the conveying direction 46.

Figure 4:
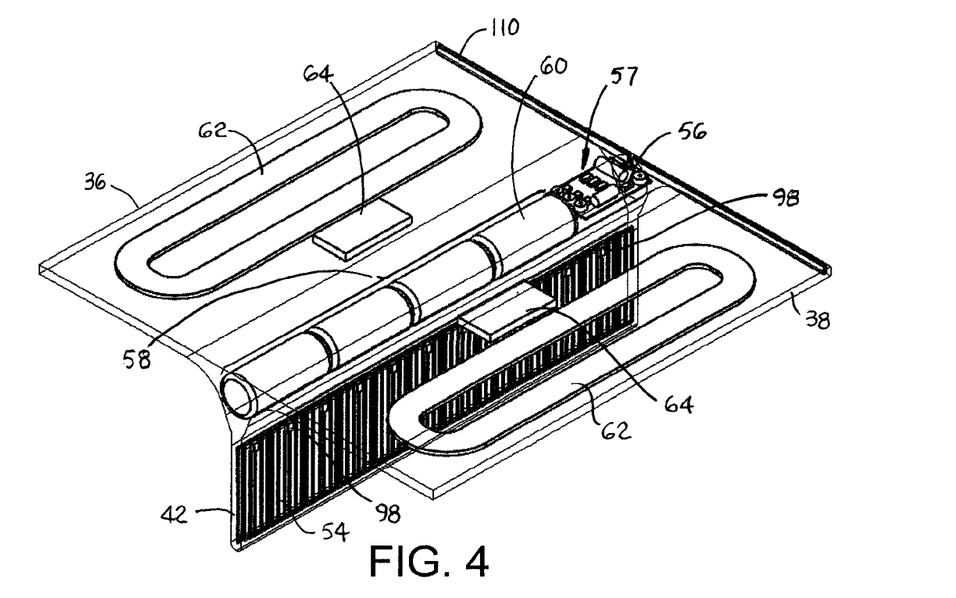
FIG. 4 is an isometric view of a tray usable in the conveyor of FIG. 1 with the tray body shown in phantom lines.

As shown in FIG. 4, a series of forcer drive coils 54 is housed in the tray blade 42. The coils 54 are arranged in an alternating three-phase pattern along the length of the blade 42. A tray controller 56 housed in the tray 36 electronically commutates the currents through the three-phase coils 54 to produce an electromagnetic field that travels along the blade 42 and interacts with the static magnetic field in the slot. The controller 56 and auxiliary components are mounted on a circuit board 57. The cores of the coils 54 are ironless to avoid attraction to the rail magnets and increased friction. The drive coils 54 thus form a brushless linear dc motor with the permanent-magnet arrays in the rails. The permanent magnet arrays form the motor's stator and the coacting tray coils 54 form the motor's forcer.

A battery 58 consisting of one or more cells 60 powers the controller 56 and provides the commutated currents to the coils 54. Because the permanent magnets are in the rails and the trays are battery-powered, no wiring is needed in the tray conveyor segments. The tray segments are completely passive. Optional charging coils 62 in one or both sides of the tray 36 are available to recharge the battery 58. Alternatively, the charging coils 62 could be used to couple power to the tray 36 to power the controller 56 and the forcer coils 54. In that alternative mode of operation, in which the primary power is inductively coupled to the tray 36 through the charging coils 62, the battery 58 can be used as a secondary power source when external power is unavailable to the charging coils. So either the battery 58 or the charging coils 62 can serve as the in-tray power supply. When the primary external power source is active, the charging coils 62 can trickle-charge the battery 58. Tuning capacitors 64 connected in parallel with the charging coils 62 are available to tune the charging-coil and capacitor circuit to the resonant frequency of the external charging waveform to increase the efficiency of the induced power transfer to the tray 36. As a third alternative, the battery 58 could be non-rechargeable and serve as the exclusive power source. In that case the charging coils 62 and the tuning capacitors 64 would not be necessary. If the battery 58 is not rechargeable, it could be replaceable though an end cap (66, FIG. 2), or the entire tray could be disposable.

Figure 5:
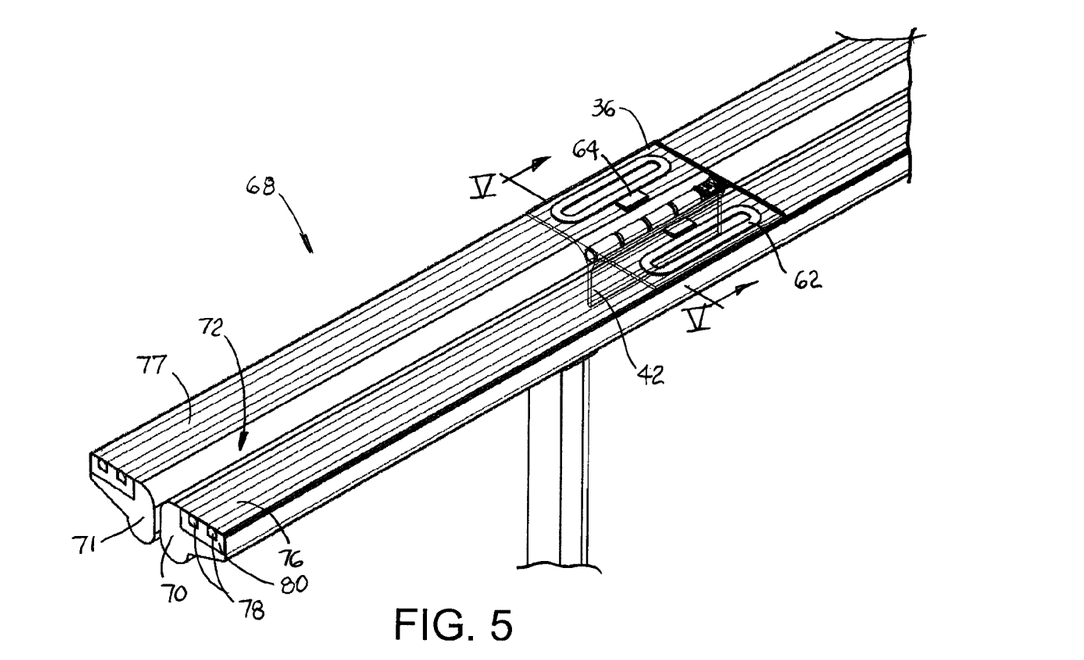
FIG. 5 is an isometric view of a portion of another version of a conveyor as in FIG. 1 with a conductor loop along both sides for inductively coupling power to the tray.
Figure 6:
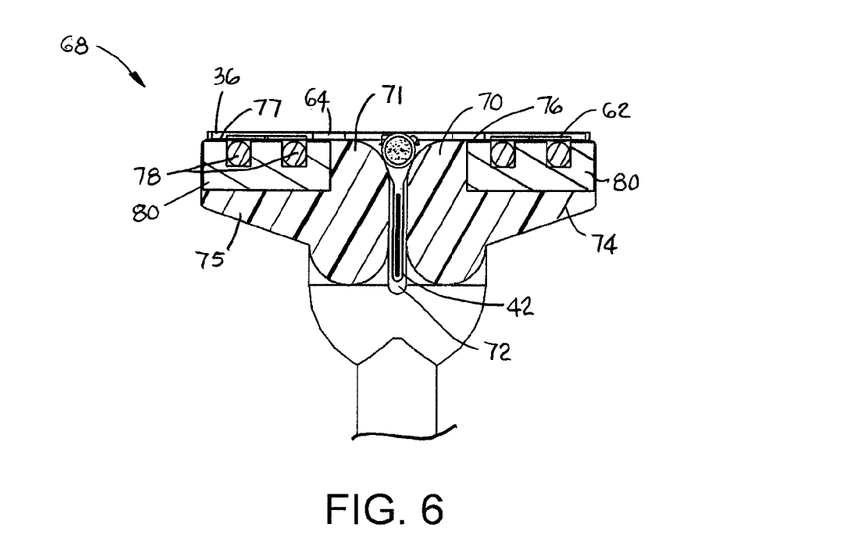
FIG. 6 is an enlarged cross section of the conveyor of FIG. 5 viewed along lines VI-VI of FIG. 5.

When the charging coils 62 are used either to recharge the battery 58 or as part of the main power source, one or more active conveyor segments 68 as in FIGS. 5 and 6 are used. Two closely spaced rails 70, 71 define a narrow slot 72 to receive and guide the blade 42 of the tray 36. The rails 70, 71 each have lateral extensions 74, 75 with flat tops 76, 77 supporting the tray 36. Primary conductor loops 78 powered by an ac power source (not shown) extend along the length of the active conveyor section 68 in each rail extension 74, 75. The primary conductor loops 78 are mounted in E cores 80. The conductor loops are, for example, low-loss wire, such as Litz wire. Primary tuning capacitors (not shown) are distributed across the loop along the length of the rails 70, 71 to provide highly efficient high-Q inductive power transfer to the secondary charging coils 62 in the tray 36. The majority of the conveyor can be constructed of active segments 68 as in FIG. 5 or of a combination of active segments and passive segments 22 as in FIG. 1. For example, a conveyor having a main carryway run along which articles are conveyed and a return run could have passive segments on the carryway and active inductive-power-transfer segments on the return to recharge the batteries. In another alternative the active tray segment has a primary conductive loop on only one side. In that case a tray could be made with a secondary charging coil and tuning capacitor on only one side.

Figure 14:
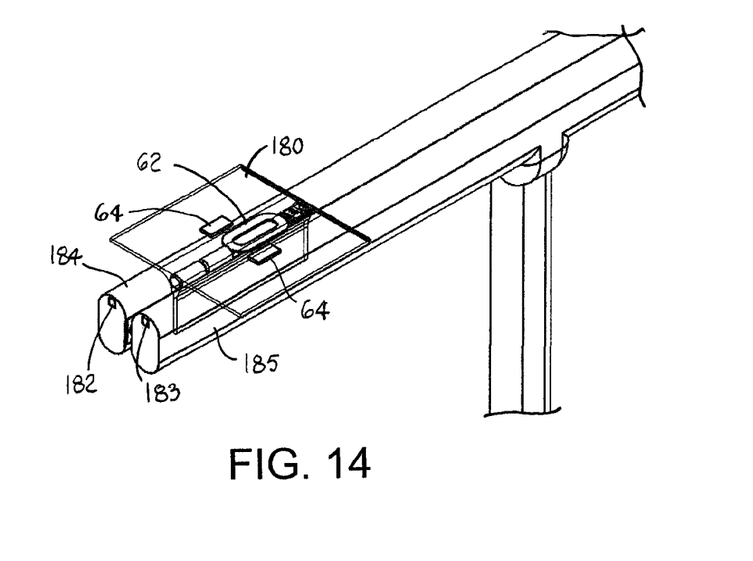
FIG. 14 is an isometric view of a portion of another version of a conveyor as in FIG. 1 with a conductor loop shared by both sides for inductively coupling power to the tray over a single secondary coil in the tray.

Yet another tray-charging or -powering arrangement is shown in FIG. 14. In this version the tray 180 has a single centrally located charging coil 62 connected in parallel with two tuning capacitors 64. Although two tuning capacitors 64 are shown, a single tuning capacitor could be used instead. In this version a primary conductor loop is formed by a left conductor segment 182 in a left rail 184 connected to a right conductor segment 183 in a right rail 185. The endless primary conductor loop is tuned to resonance with one or more tuning capacitors (not shown) and is powered by an ac source (not shown). This version can be used with rails without lateral rail extensions.

Figure 7:
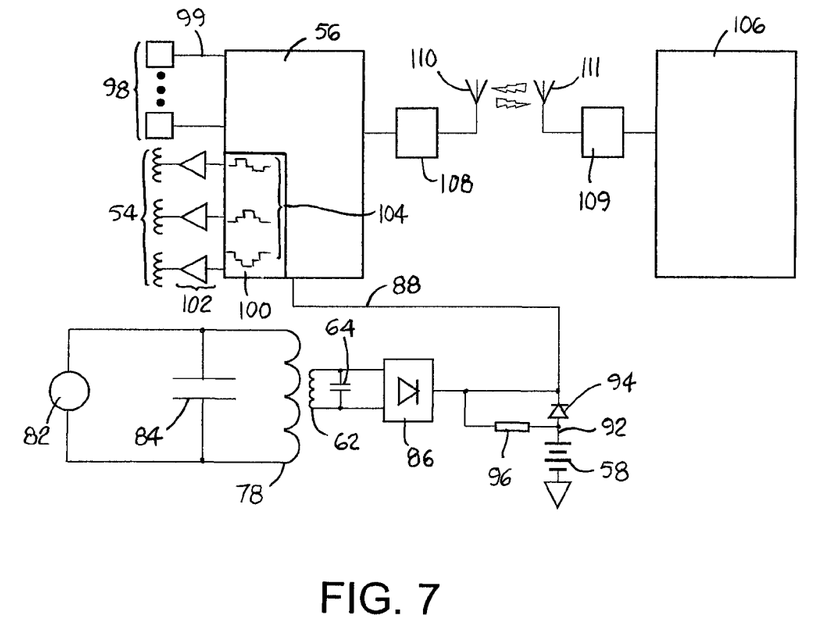
FIG. 7 is a schematic block diagram of one version of an electrical system for a conveyor as in FIG. 5 or FIG. 1.

One version of an electrical block diagram schematic of a conveyor as in FIG. 1 or FIG. 5 is shown in FIG. 7. The tray controller 56 in this example is powered by either an external ac power source 82 or the battery 58. When the external source 82 is available, its power is inductively coupled to the tray from the primary conductive loop 78 to the secondary charging coil 62. The tuning capacitors 84, distributed along the length of the loop 78, and the tray tuning capacitor 64 tune the primary and secondary circuits to resonate at the frequency of the ac source 82 to maximize power transfer. The secondary ac voltage is converted to dc by a rectifier or ac-to-dc converter 86 whose output is diode-ORed with the battery voltage 92 through a diode 94 to produce a dc supply voltage 88 that powers the tray. Normally, the externally sourced voltage will exceed the battery voltage 92 and power the tray controller 56 and other active devices in the tray. The battery 58 switches in to power the tray when the externally sourced voltage drops below the battery voltage 92. When the external voltage exceeds the battery voltage 92, it charges the battery 58 through a charging element 96. The diode-ORed arrangement constitutes a rudimentary switch that switches between external and battery power for the tray. One example of an alternative switch useful for switching from external power to battery power includes an electromechanical or an electronic switch that connects the tray's dc supply voltage 88 to the battery voltage 92 from the externally sourced dc voltage when the external power is too low. A low-voltage detector sensing the incoming ac voltage or its rectified dc voltage sends a low-voltage signal to the switch to switch to battery power.

A series of magnetic field sensors 98, such as Hall-effect sensors positioned periodically along the length of the tray blade 42 (FIG. 4), determine the position of the tray coils 54 relative to the magnetic-field positive and negative peaks. The sensor signals 99 are sent to the controller 56, which includes a commutator 100. The commutator 100 is a software routine that runs in program memory of the controller 56, e.g., a microcomputer or microcontroller. The commutator 100 generates three output signals 104, which are properly phased as determined by the sensor signals 99, to control the current through the three-phase forcer coils 54. The three output signals 104 are amplified by amplifiers 102 that supply the commutated current waveforms to the forcer coils 54 to drive the tray.

The tray controller 56 in each tray communicates with a conveyor controller 106 external to the trays. A transmitter-receiver 108 on the tray circuit board 57 is linked wirelessly over antennas 110, 111 to an external transmitter-receiver 109 connected to the system controller 106. The system controller 106 sends command and data requests to the tray controllers 56 over the wireless link and receives data from the tray controllers. The tray antenna 110 is shown in FIG. 4 as a dipole embedded in the tray platform 38 along one end of the tray 36 as one example.

Figure 8:
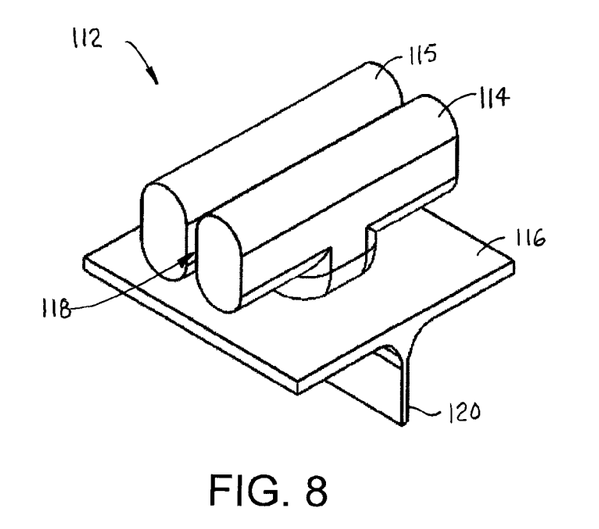
FIG. 8 is an isometric view of a tray carriage usable in a conveyor as in FIG. 1 or FIG. 5.

A tray carriage 112 used to transfer trays from one conveyor segment to another is shown in FIG. 8. The carriage 112 is the same as the trays described previously, but with a pair of passive transfer rails 114, 115 mounted on the top surface 116. Like the tray rails 26, 27 in FIG. 2, the transfer rails 114, 115 have permanent-magnet arrays disposed along their lengths. The narrow slot 118 between the transfer rails 114, 115, extends in length perpendicular to the plane of the carriage blade 120.

Figure 9A:
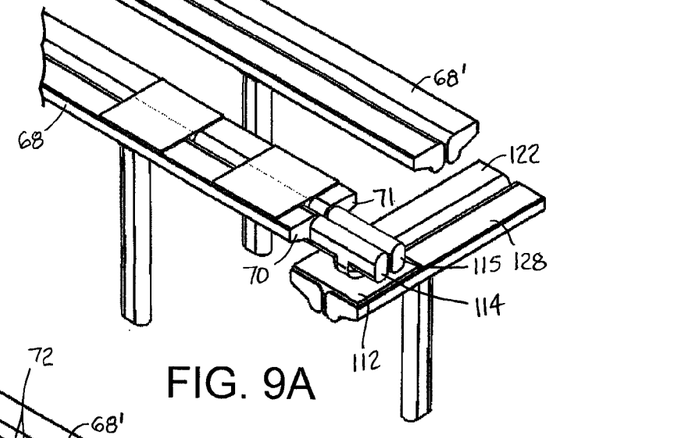
FIGS. 9A-9C are sequential isometric views of one end of a conveyor as in FIG. 5 using a tray carriage as in FIG. 8 to form an endless conveyor.
Figure 9B:
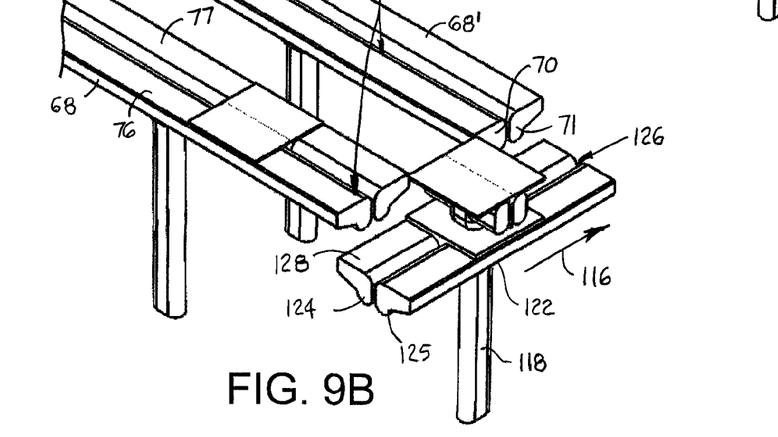
Figure 9C:
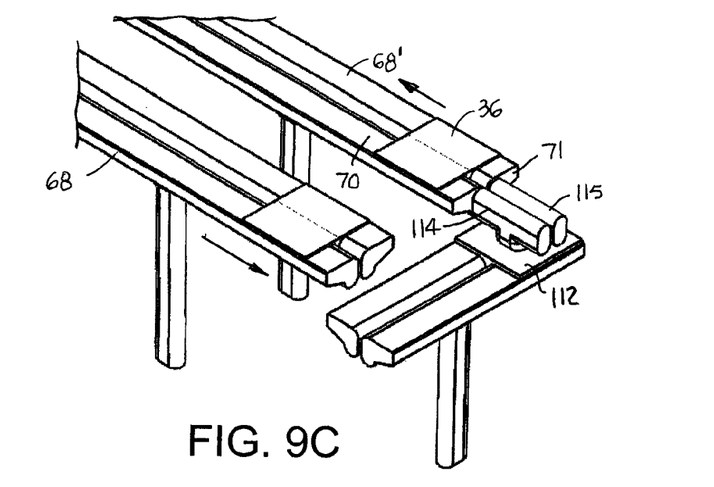

FIGS. 9A-9C illustrate how the carriage 112 transfers trays from one conveyor segment 68 to another 68'. A tray 36 advancing along a first conveyor segment 68 at an end of a first conveyor run is received on the transfer rails 114, 115 of the carriage 112. The carriage 112 is supported on a carriage conveyor segment 122 extending perpendicular to the planes of the slots 72 in the first and second conveyor segments 68, 68'. The carriage conveyor segment 122 is below the level of the tray conveyor segments 68, 68' so that the transfer rails 114, 115 are at the same level as the tray conveyor rails 70, 71. In that way the transfer rails 114, 115 and the transfer slot 118 can be aligned with the tray coils 70, 71 and the tray slot 72 on the first tray conveyor segment 68 to smoothly receive the tray 36 as in FIG. 9A. Once the tray 36 resides completely on the carriage 112, it stops itself. The carriage 112 energizes its drive coils and propels itself and the tray 36 laterally in a transverse direction 116 as in FIG. 9B along the carriage conveyor segment 122. The carriage conveyor segment 122 has permanent-magnet carriage rails 124, 125 and a carriage slot 126 like the tray conveyor segments. The carriage segment 122 has a shorter leg 118 than the tray conveyor segment to position the top surface 128 of the carriage segment 122 skewed perpendicular to and below the tops of 76, 77 of the conveyor segments 68, 68'. When the carriage 112 reaches a position with its transfer rails 114, 115 aligned with the tray rails 70, 71 of the second tray conveyor segment 68' as in FIG. 9C, the carriage 112 stops, and the tray 36 energizes itself to advance off the transfer rails 114, 115 and onto the aligned conveyor segment rails 70, 71 on the second conveyor segment 68'. With an identical carriage conveyor segment at the opposite end of the two tray conveyor sections, an endless tray conveyor is formed. The carriage 112 then translates back to the first conveyor segment 68 to receive the next tray.

Figure 10:
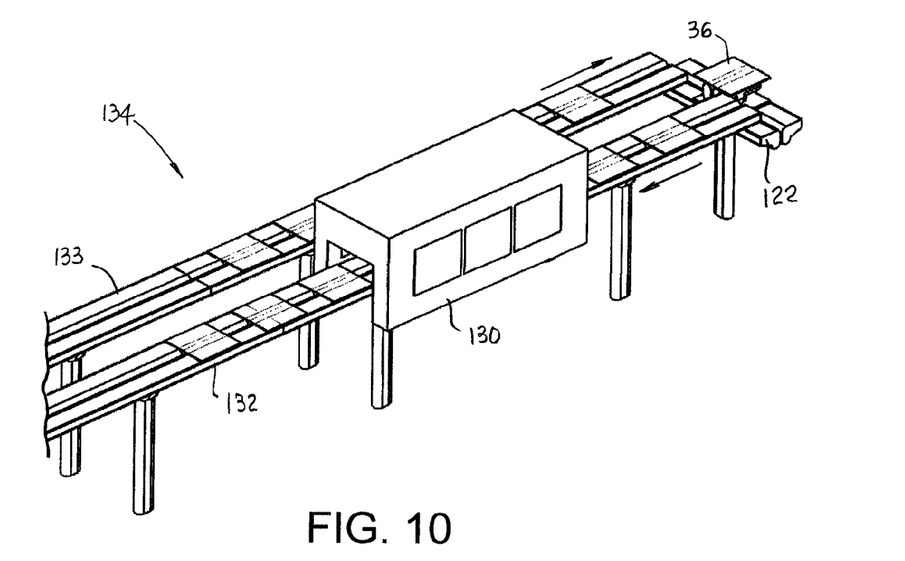
FIG. 10 is an isometric view of a tray washer for a conveyor as in FIG. 1 or FIG. 5.

A tray washer 130 is shown covering a portion of the return run 132 in an endless conveyor configuration 134 in FIG. 10. A carriage conveyor segment 122 is shown at one end of the endless conveyor 134 for transferring trays 36 from a carryway run 133 to the return run 132. The tray washer 130 includes spray nozzles and brushes to clean, rinse, sanitize, and dry the trays 36.

Figure 11:
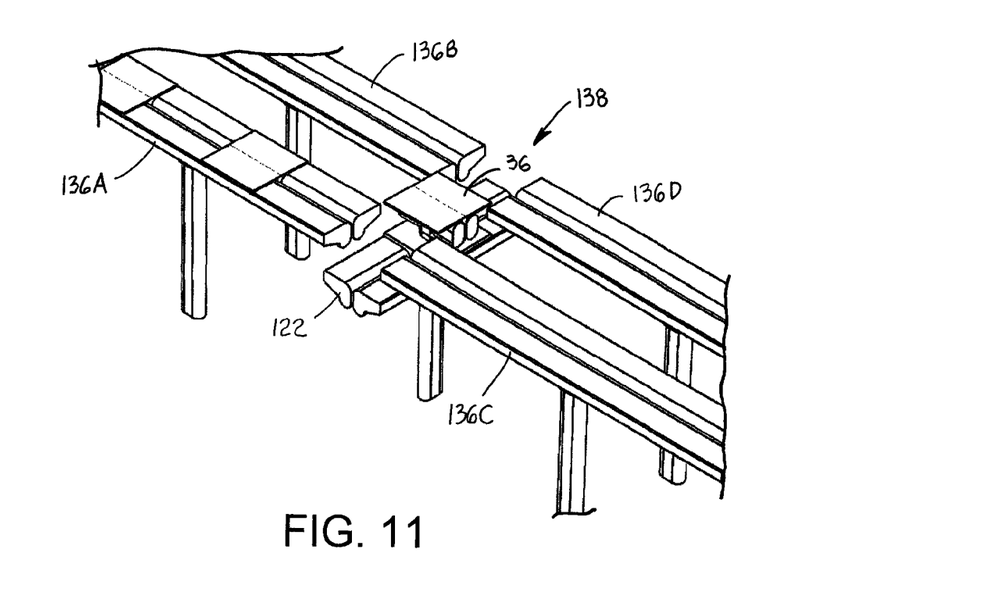
FIG. 11 is an isometric view of a tray carriage as in FIG. 8 used to transfer trays from one conveyor segment to others.

As shown in FIG. 11, the carriage conveyor segment 122 can be used to transfer trays 36 between many conveyor sections 136A, 136B, 136C, 136D. The four tray conveyor sections are arranged parallel to each other with two on each side of a gap 138 across which the carriage 112 translates perpendicular to the tray conveyor sections 136A-D.

Figure 12A:
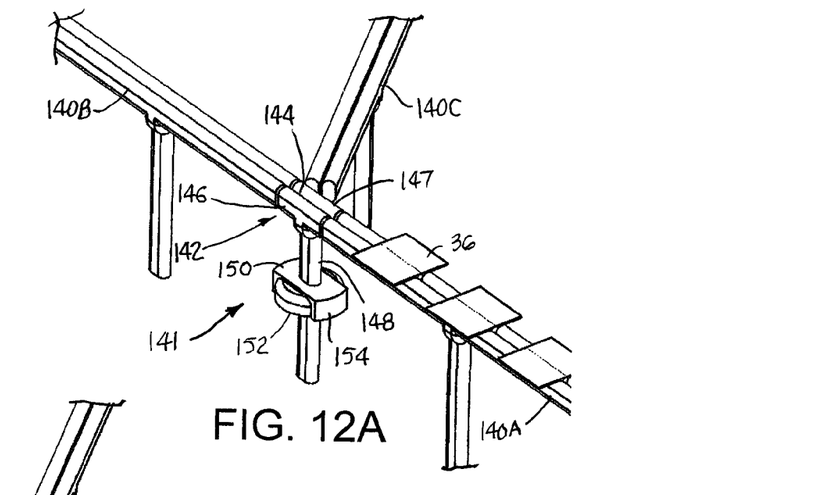
FIGS. 12A-12C are sequential isometric views of a tray diverter section for a conveyor as in FIG. 1 or FIG. 5.
Figure 12B:
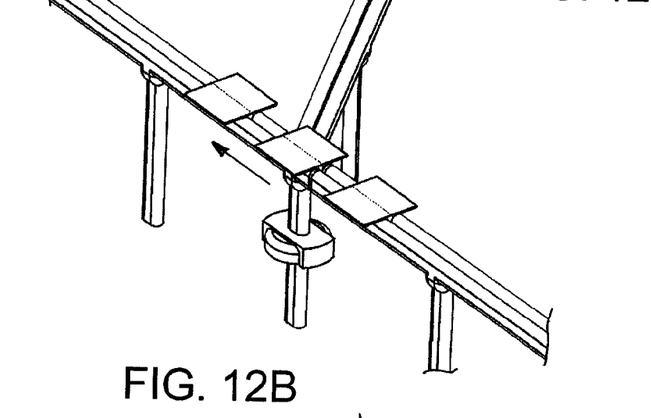
Figure 12C:
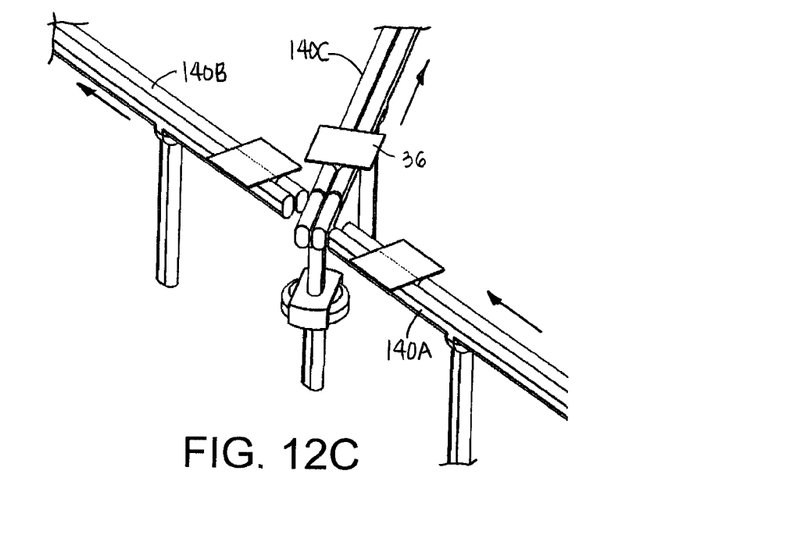

The conveyor configuration of FIGS. 12A-12C has two tray conveyor segments 140A, 140B in line across a gap 142. A third tray conveyor segment 140C extends obliquely away from the gap 142. The obliquely oriented conveyor segment 140C constitutes a divert path for trays 36 away from a straight-through path on the in-line conveyor segment 140B. A diverter carriage segment 141 includes a diverter carriage 144 that resides in the gap 142. Diverter rails 146, 147 with embedded permanent-magnet arrays are selectively aligned with either the rails of the in-line tray conveyor segments 140A, 140B or with the oblique tray conveyor segment 140C. The diverter carriage 144 includes a post 148 extending downward from the rails 146, 147 to a diverter carriage platform 150, which is supported on a cylindrical diverter base 152. The base 152 houses a ring of permanent magnets that creates a magnetic field directed radially from the base's periphery. The diverter carriage platform 150 has side skirts 154 that extend downward around the periphery of the diverter base 152. Diverter carriage drive coils (not shown) in the skirts driven by a diverter controller (not shown) in the diverter carriage 144 produce an electromagnetic field that interacts with the permanent-magnet magnetic field of the base 152 to rotate the diverter carriage 144 between an in-line tray pass-through position as in FIGS. 12A and 12B and an oblique tray divert position as in FIG. 12C. The diverter carriage segment 141 can be used to merge products from the tray segments 140B, 140C onto the tray segment 140A when the trays 36 advance opposite to the direction of the arrows in FIG. 12C.

Figure 13:
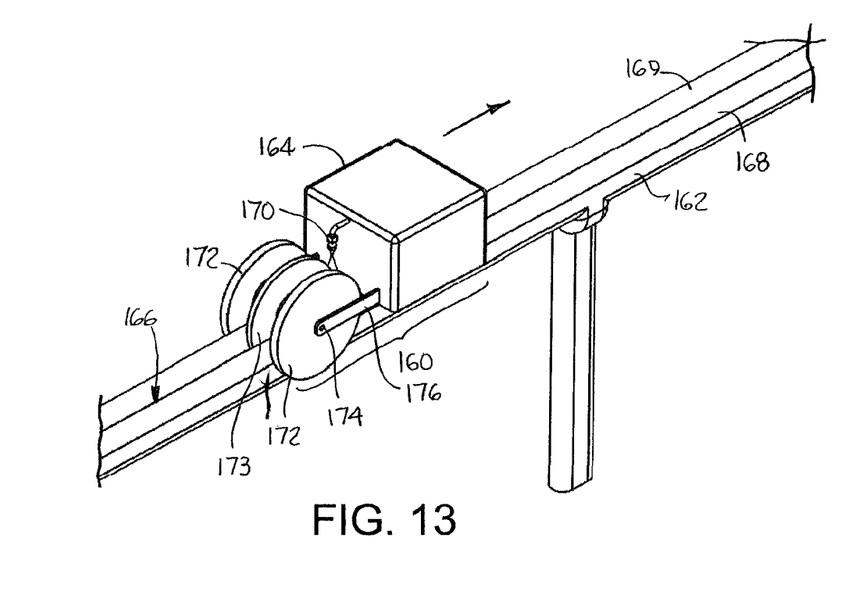
FIG. 13 is an isometric view of a rail scrubber on a conveyor as in FIG. 1.

A rail scrubber 160 is shown in FIG. 13 cleaning a tray conveyor section 162. The scrubber 160 has a housing 164 covering water, cleanser, and sanitizer tanks (not shown). The housing 164 mounts on a base (not shown) such as a conveyor tray with a drive-coil blade that fits in the slot 166 between the two rails 168, 169 and propels the scrubber 160 along the conveyor section 162. One or more nozzles 170 spray the water, cleanser, or sanitizer onto the rails 168, 169. Outer rotary brushes 172 and an inner rotary brush 173 are mounted on an axle 174 retained at its ends by arms 176 attached to the scrubber housing 164. The outer rotary brushes 172 have bristles at least on an inner side to scrub the outer sides of the rails 168, 169. The inner brush 173 rides in the slot 166 and has bristles on both sides to scrub the inside walls of the rails 168, 169.

What is claimed is:

1. A conveyor comprising:
    a rail having an array of permanent magnets embedded in and extending along the length of the rail to form a permanent-magnet stator creating a magnetic field;
    a tray supported on the rail and having a top article-supporting surface and having a series of commutated drive coils housed in the tray as a forcer coacting with the permanent-magnet stator to form a brushless linear dc motor;
    wherein the tray further includes a tray controller housed in the tray driving the drive coils to produce a traveling electromagnetic wave that interacts with the magnetic field to propel the tray along the rail.

2. A conveyor as in claim 1 comprising:
    a tray conveyor segment extending from a first end to a second end in a conveying direction and including:
    a pair of the rails closely spaced and separated by a slot and having tops, each of the rails including such an array of permanent magnets creating a magnetic field across the slot;
    wherein the tray includes:
      a platform forming the top article-supporting surface and a bottom surface supported on the tops of the rails;
      a blade extending downward from the bottom surface and in the conveying direction to ride in the slot and housing the series of commutated drive coils;
      wherein the tray controller drives the drive coils to produce the traveling electromagnetic wave that interacts with the magnetic field to propel the tray in the conveying direction.

3. A conveyor as in claim 2 wherein the drive coils are three-phase coils, the tray controller commutates current through the three-phase coils to form the brushless linear dc motor with the permanent-magnet arrays in the rails.

4. A conveyor as in claim 3 wherein the tray includes sensors in the blade sensing the magnitude of the magnetic field and sending sensor signals to the tray controller to commutate the current.

5. A conveyor as in claim 1 wherein the drive coils have ironless cores.

6. A conveyor as in claim 1 wherein the tray includes a battery to power the tray controller and the series of drive coils.

7. A conveyor as in claim 1 further comprising a primary conductor loop external to the tray and extending in the conveying direction along a length of the rail and wherein the tray further includes a secondary coil inductively coupled to the primary conductor loop to supply power to the tray while on the rail.

8. A conveyor as in claim 7 wherein the tray includes a battery to power the tray controller and the series of drive coils and wherein the battery is recharged through the secondary coil.

9. A conveyor as in claim 7 wherein the tray includes a battery and a switch to connect between powering the tray controller through the secondary coil or powering the tray controller from the battery upon a loss of power from the secondary coil.

10. A conveyor as in claim 7 further comprising primary capacitors connected to the primary conductor loop at spaced apart positions along its length and wherein the tray includes a secondary capacitor connected to the secondary coil and wherein the primary conductor loop and the secondary coil are tuned for resonant delivery of power to the tray.

11. A conveyor as in claim 2 further comprising first and second primary conductor loops external to the tray and extending in the conveying direction along the length of the rails on the opposite side and wherein the tray further includes first and second secondary coils inductively coupled to the first and second primary conductor loops, respectively.

12. A conveyor as in claim 11 wherein the rails have laterally outward extensions in which the primary conductor loop and the second primary conductor loop are embedded and which support the platform under the secondary coil and the second secondary coil.

13. A conveyor as in claim 7 comprising a pair of the rails closely spaced and separated by a slot and wherein the primary conductor loop includes a first conductor segment in one of the rails connected to a second conductor segment in the other of the rails and wherein the secondary coil is centrally located in the tray.

14. A conveyor as in claim 2 wherein the slot widens at the tops of the rails.

15. A conveyor as in claim 2 wherein the tops of the rails are convexly curved.

16. A conveyor as in claim 2 further comprising a rail base joining the rails and forming a closed end of the slot and a series of single legs extending downward from the base to mount the conveyor to a floor.

17. A conveyor as in claim 1 wherein the tray further includes an antenna for wireless communication with the tray controller.

18. A conveyor as in claim 2 further comprising:
a carriage conveyor segment like the tray conveyor segment but arranged with carriage rails and a carriage slot perpendicular to and skewed below the rails and slot of the tray conveyor segment;
a carriage including:
a carriage platform supported on the tops of the carriage rails;
a carriage blade extending downward from the carriage platform to ride in the carriage slot;
a series of carriage drive coils in the carriage blade;
a pair of closely spaced transfer rails separated by a transfer slot and extending up from the carriage platform to tops level with the tops of the rails in the tray conveyor segment to receive a tray from or discharge a tray to the tray conveyor segment;
a carriage controller driving the carriage drive coils to produce a traveling electromagnetic wave that interacts with the magnetic field in the carriage slot to propel the carriage along the carriage conveyor segment in a transverse direction from a first position in which the transfer rails are aligned with the rails of the tray conveyor segment to a second position in which the transfer rails are transversely offset from the rails of the tray conveyor segment.

19. A conveyor as in claim 18 comprising a plurality of the tray conveyor segments arranged in parallel on the same side or on opposite sides of the carriage conveyor segment so that the carriage can receive the tray from one of the tray conveyor segments and discharge the tray to another of the tray conveyor segments.

20. A conveyor as in claim 2 further comprising:
a plurality of the tray conveyor segments in which a first one of the tray conveyor segments extends obliquely from the first end of a second one of the tray conveyor segments across a gap;
a diverter carriage segment having a cylindrical diverter base housing a ring of permanent magnets creating a magnetic field about the periphery of the diverter base;
a diverter carriage including:
a diverter carriage platform supported on the diverter base and having side skirts extending downward around the periphery of the diverter base;
a series of diverter carriage drive coils in each of the side skirts;
a pair of closely spaced diverter rails separated by a diverter slot and extending up from the diverter carriage platform to tops level with the tops of the rails in the first and second tray conveyor segments to receive a tray from or discharge a tray to the tray conveyor segment;
a diverter carriage controller driving the diverter carriage drive coils to produce a traveling electromagnetic wave that interacts with the magnetic field around the diverter base to rotate the diverter from a first position in which the diverter rails are aligned with the rails of the first one of the tray conveyor segments to a second position in which the diverter rails are aligned with the rails of the second one of the tray conveyor segments.

21. A conveyor as in claim 2 further comprising a scrubber including:
a blade that rides in the slot;
a series of scrubber coils housed in the blade;
a scrubber controller driving the scrubber coils to produce a traveling electromagnetic wave that interacts with the magnetic field to propel the tray along the tray conveyor segment;
a supply of cleansing solution;
a spray nozzle spraying the cleansing solution onto the rails.

22. A conveyor as in claim 21 wherein the scrubber further includes rotary scrub brushes that ride in the slot and along the outer sides of the rails to scrub the rails.

23. A conveyor comprising:
a tray including:
a top article-supporting surface;
a series of drive coils;

a tray controller;
a power supply supplying power to the tray controller to commutate the currents in the series of drive coils;
a rail supporting the tray and having an array of permanent magnets extending along the length of the rail;
wherein the array of permanent magnets and the drive coils in the tray form a brushless linear dc motor to propel the tray along the rail.

24. A conveyor as in claim 23 wherein the power supply comprises a battery in the tray.

25. A conveyor as in claim 23 wherein the rail includes an ac power source and a primary conductor loop powered by the ac power source and wherein the power supply in the tray comprises a secondary coil inductively coupled to the primary conductor loop to transfer power to the tray.

26. A conveyor tray comprising:
a platform having a first end and a second end defining the length of the tray and a top article-supporting surface and a bottom surface extending from the first end to the second end;
a blade extending downward from the bottom surface from the first end to the second end;
a series of drive coils in the blade;
a tray controller driving the drive coils; and
a power supply in the tray supplying power to the tray controller and the drive coils.

27. A conveyor tray as in claim 26 wherein the power supply comprises a battery to power the tray controller and the series of drive coils.

28. A conveyor tray as in claim 26 wherein the power supply in the tray comprises a secondary coil inductively coupling power to the tray from an external source.

29. A conveyor as in claim 28 wherein the tray includes a battery to power the tray controller and the series of drive coils and wherein the battery is recharged through the secondary coil.

30. A conveyor as in claim 28 wherein the tray includes a battery and a switch to switch between powering the tray controller through the secondary coil and powering the controller from the battery upon a loss of power from the secondary coil.

31. A conveyor as in claim 28 further comprising a secondary capacitor connected to the secondary coil and wherein the secondary capacitor and the secondary coil are tuned for resonant delivery of power to the tray from the external source.

32. A conveyor tray as in claim 26 wherein the drive coils are three-phase coils and the tray controller commutates current through the three-phase coils.

33. A conveyor as in claim 26 wherein the drive coils have ironless cores.

* * * * *